United States Patent
Haile et al.

(10) Patent No.: US 7,083,523 B2
(45) Date of Patent: Aug. 1, 2006

(54) DAMPER FOR A VEHICLE TORQUE TRANSFERRING ASSEMBLY

(75) Inventors: Yohannes G. Haile, Canton, MI (US); Thomas E. Kamrath, Ann Arbor, MI (US); Rand S. Schenck, Saline, MI (US); Norman Szalony, Brighton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 107 days.

(21) Appl. No.: 10/793,517

(22) Filed: Mar. 4, 2004

(65) Prior Publication Data

US 2005/0197194 A1    Sep. 8, 2005

(51) Int. Cl.
*F16C 3/02* (2006.01)

(52) U.S. Cl. ............................ 464/180; 464/181
(58) Field of Classification Search ............ 464/127, 464/180, 181, 183; 181/196, 207, 208; 180/381
See application file for complete search history.

(56) References Cited

U.S. PATENT DOCUMENTS

| | | | |
|---|---|---|---|
| 1,863,874 A * | 6/1932 | Quarnstrom | |
| 2,001,166 A | 5/1935 | Swennes | |
| 2,751,765 A * | 6/1956 | Rowland et al. | 464/180 |
| 3,734,277 A * | 5/1973 | Bucalo | |
| 3,769,813 A | 11/1973 | Okada | |
| 4,014,184 A | 3/1977 | Stark | |
| 4,272,971 A * | 6/1981 | Loyd et al. | 464/181 |
| 4,909,361 A * | 3/1990 | Stark et al. | 180/381 X |
| 5,013,282 A | 5/1991 | Keller | |
| 5,287,768 A | 2/1994 | Amborn et al. | |
| 5,331,737 A | 7/1994 | Jarvela | |
| 5,397,272 A * | 3/1995 | Smiley et al. | 464/181 |
| 5,566,721 A | 10/1996 | Breese | |
| 5,868,627 A | 2/1999 | Stark et al. | |
| 5,904,622 A | 5/1999 | Breese et al. | |
| 5,976,021 A | 11/1999 | Stark et al. | |
| 6,023,830 A | 2/2000 | Cole et al. | |
| 6,234,911 B1 | 5/2001 | Breese et al. | |
| 6,254,488 B1 | 7/2001 | Hill | |
| 2002/0006832 A1 | 1/2002 | Glowacki et al. | |
| 2003/0176224 A1 | 9/2003 | Armitage et al. | |
| 2005/0159229 A1* | 7/2005 | Lee et al. | 464/181 |
| 2005/0215331 A1* | 9/2005 | Campbell | 464/181 |

OTHER PUBLICATIONS

Picture of a damper from the driveshaft of a 2003 Hyundai Santa Fe (1 sheet).

* cited by examiner

*Primary Examiner*—Greg Binda

(57) ABSTRACT

A lightweight damper for reducing noise and vibration in torque transferring assemblies that is easily assembled and cost efficient. The damper may be formed from a foam material having a density less than 1.4 lb/ft³, and includes an outer surface that is resiliently biased against the inner surface of a tubular shaft when installed. In a second embodiment, the damper is formed from a sheet of material that dissipates energy such as noises and vibrations through movement of the layers relative to each other. In third embodiment, the dampening sheet and foam damper are combined to provide a damper that dampens noises and vibrations across a large frequency range.

9 Claims, 9 Drawing Sheets

DAMPER FOR A VEHICLE TORQUE TRANSFERRING ASSEMBLY

BACKGROUND OF THE INVENTION

The present invention relates to a damper for reducing noise, vibration, and harshness issues associated with torque transferring assemblies, such as vehicle driveshafts and propshafts.

Torque transferring assemblies are widely used in vehicles to transfer torque between the engine and the wheels. Typically a torque transferring assembly is arranged between a transmission and an axle assembly, a power transfer unit and an axle assembly, or a transfer case and an axle assembly. To reduce weight, torque transferring assemblies typically include a tubular shaft spanning between a source of rotational energy and the axle assembly. Tubular shafts transmit and amplify vibration and noises from the engine, axle assembly, transmission, transfer case, and wheels. Yet another problem with tubular shafts in torque transferring assemblies is that they produce undesirable noise when rocks or other debris forcefully impact the tubular shaft during vehicle operation.

Some manufacturers have attempted to overcome impact related noises by inserting rigid corrugated cardboard liners into the tubular shaft. The corrugated cardboard liners generally engage the inner wall of the tubular shaft in a press fit relationship to prevent movement of the liner and to dampen impact related noises. These cardboard liners generally do not reduce structural or airborne noise and vibration. In some cases, the corrugated cardboard liners also include rubber stoppers or rubber seals to prevent movement of the corrugated cardboard liner relative to the tubular shaft and thereby prevent noise and vibration caused by movement of the liner relative to the tubular shaft. While these stiff corrugated liners provide generally acceptable reduction in impact related noises, they generally provide minimal reduction in noises or vibrations produced or transmitted by the torque transferring assembly during operation. Another problem with most corrugated liners is that they cannot be combined with most internal dampers that reduce noise and vibration produced or transmitted by the torque transferring assembly.

To address the production or transmission of noises by the torque transferring assembly, other manufacturers have used plugs or other internal dampers inserted at specific nodes within the tubular shaft to reduce specific frequencies of noise and vibration based on damping capability limitations. These plugs typically reduce only a narrow band of frequencies are expensive and require increased assembly time to ensure correct installation at the specific node. Some internal dampers are heavy, thereby mitigating the weight saving benefits of the tubular shaft. Another problem with these plugs or internal dampers is that they generally are not capable of reducing impact noise.

Other manufacturers have also inserted foam, steel wool, cotton, or other materials into the length of the tubular shaft to act as a damper for both impact noise and other noise and vibration issues. While these materials span the length of the tubular shaft to provide dampening against impact noises, they do not reduce noise and vibrations produced or transmitted over a wide enough range of frequencies to an acceptable level.

Therefore, there is a need for a lightweight damper for hollow torque transferring assemblies that reduces noise and vibration issues over a wide frequency range to an acceptable level, and is cost efficient to produce and assemble.

SUMMARY OF THE INVENTION

In view of the above, the present invention relates to a lightweight easily assembled and cost efficient damper for reducing noise and vibration in torque transferring assemblies. The torque transferring assembly for a vehicle includes a tubular shaft having an inner surface defining an elongated cavity and a damper retained within the cavity. The damper is formed from a material having a density less than 1.4 lb/ft$^3$, and includes an outer surface that is resiliently biased against the inner surface of the tubular shaft when installed, to prevent movement of the damper relative to the tubular shaft. The damper generally has a density greater than 1.0 lb/ft$^3$ and an uninstalled density of approximately 1.2 lb/ft$^3$.

In a second embodiment, the torque transferring assembly includes a dampening sheet having a first end and a second end wherein the first end is coiled about the second end so that the first end overlaps the second end. The first and second ends are arranged to be movable relative to each other.

In a third embodiment, the torque transferring assembly includes damper having a core and a dampening sheet, wherein the dampening sheet has a first end and a second end. The first end is coiled about the core to overlap the second end and the first and second ends are moveable relative to each other.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given below, the appended claims, and the accompanying drawings in which:

DETAILED DESCRIPTION OF THE PREFERRED EMBODIMENT

Figure 1:
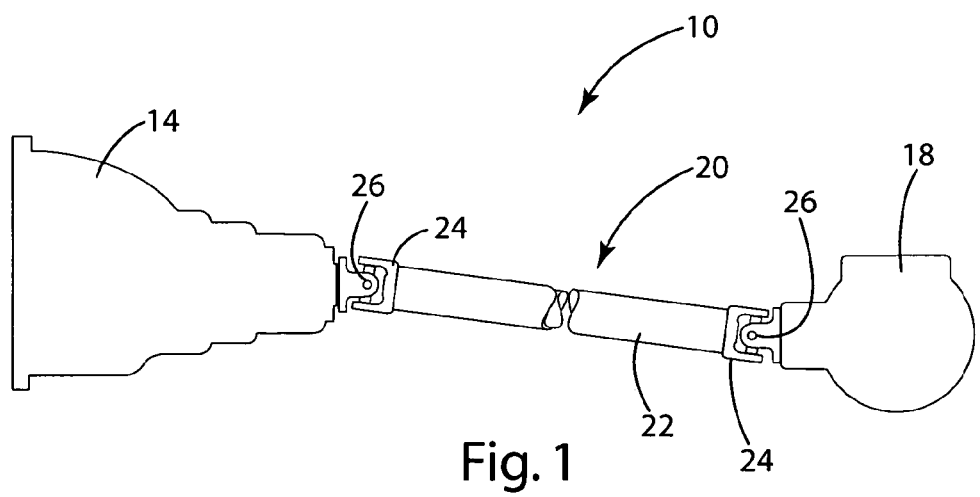
FIG. 1 is a schematic view of a vehicle drivetrain including an exemplary torque transferring assembly.
Figure 4:
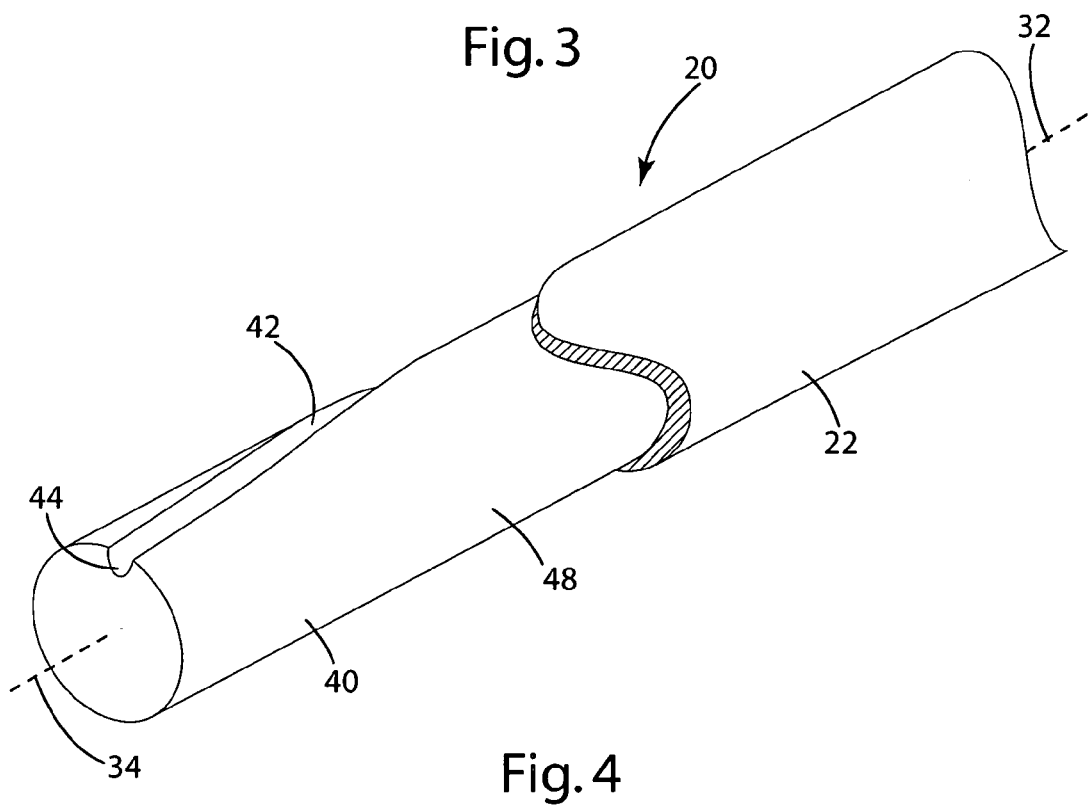
FIG. 4 is a perspective view of the foam damper extending from the tubular shaft which is shown in a partial sectional view.
Figure 7:
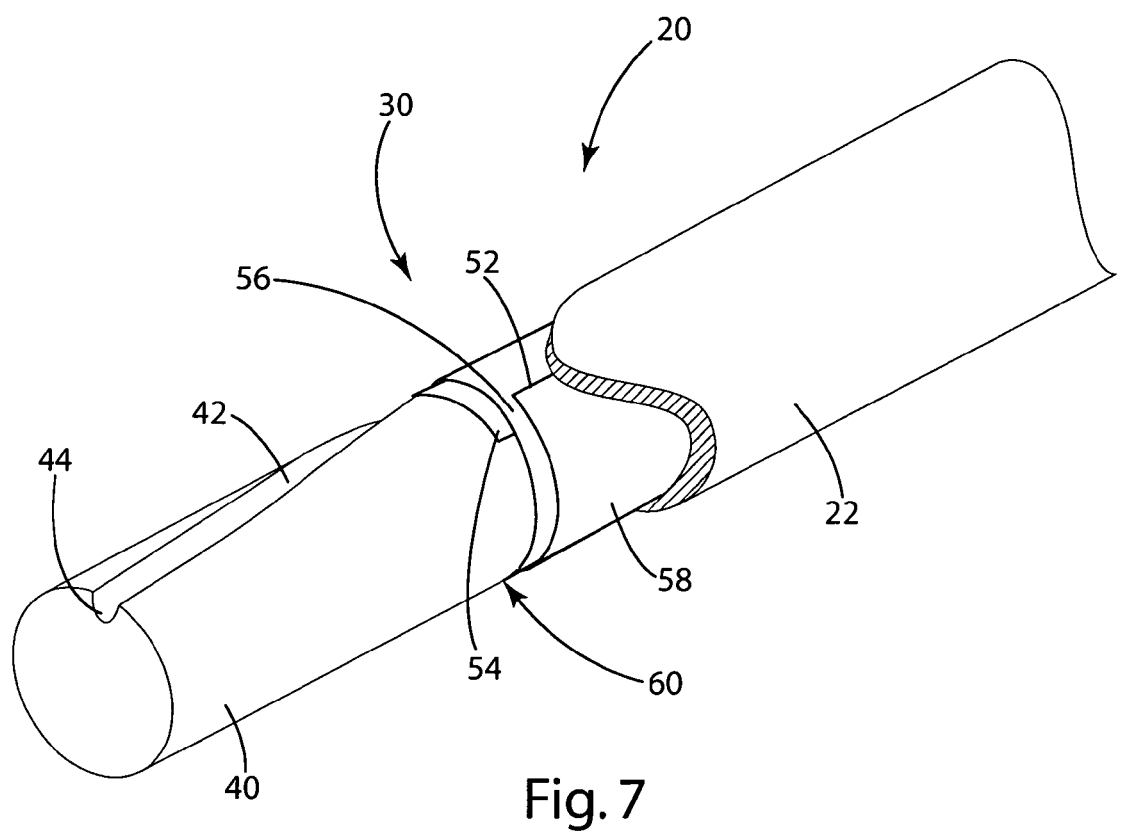
FIG. 7 is a perspective view of a combination damper extending from the tubular shaft which is shown in a partial sectional view.

An exemplary vehicle driveline 10 is illustrated in FIG. 1 with a torque transferring assembly 20 interconnecting a transmission 14 with an axle assembly 18 to transfer rotational power from the engine to the wheels of a vehicle. The torque transferring assembly 20 is illustrated as a driveshaft and includes a tubular shaft 22 into which a damper 30 is assembled (FIGS. 4 and 7). The damper 30 reduces noise, vibration, and harshness issues produced or transmitted by the torque transferring assembly 20. The damper 30 may be configured to reduce high range frequency noises and vibrations, low range frequency noises and vibrations, or a combination of low and high range frequency noises and vibrations to create a broadband damper assembly.

Figure 3:
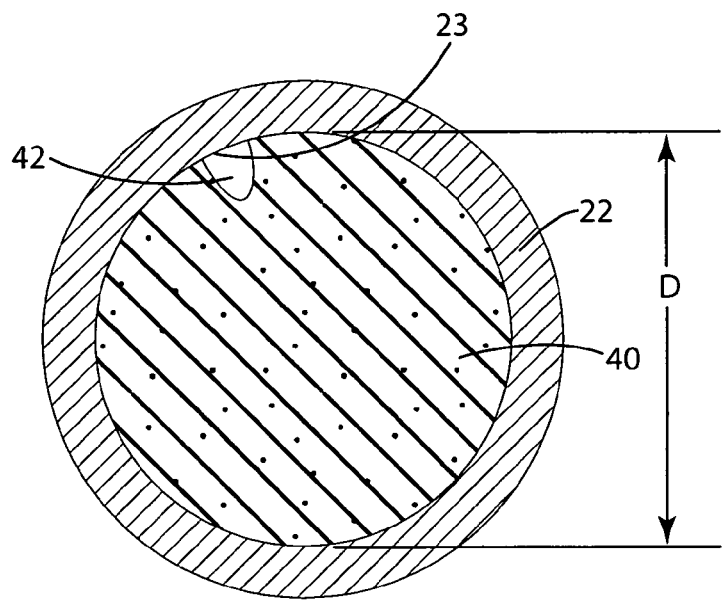
FIG. 3 is a sectional view of the foam damper within a hollow torque transferring assembly.
Figure 5:
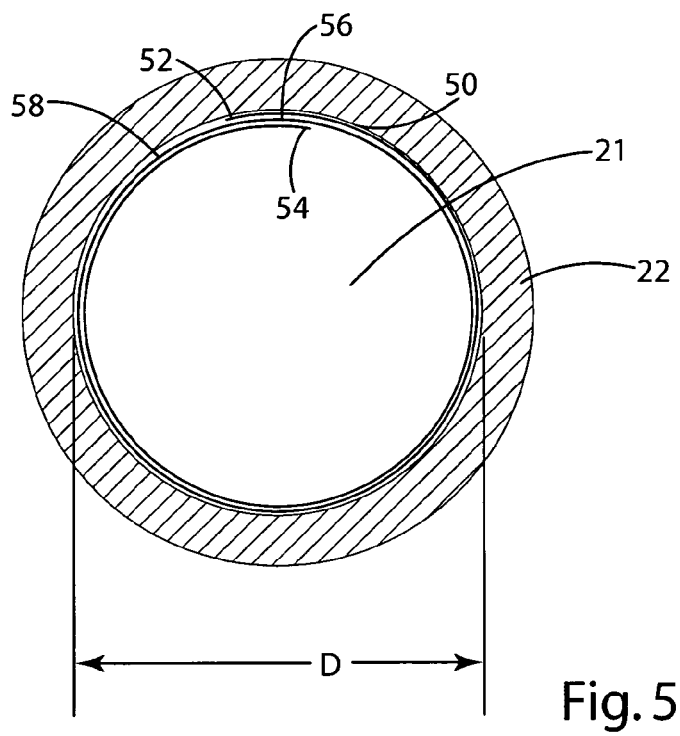
FIG. 5 is a sectional view of a dampening sheet situated within a hollow torque transferring assembly.

The torque transferring assembly 20 may be formed in a variety of configurations, but generally include the tubular shaft 22 connected to an output shaft on the transmission 14 and an input shaft on the axle assembly 18 by a pair of universal joints 26. The universal joints 26 include yokes 24 secured to each side of the tubular shaft 22. The torque transferring assembly 20 has a longitudinal axis 32 (FIG. 4) about which the torque transferring assembly, specifically the tubular shaft 22, rotates during operation of the vehicle. As shown in FIG. 3, the tubular shaft 22 includes an inner surface 23 that defines a cavity 21 as shown in FIG. 5 having an inside diameter D. Although a variety of tubular shapes may be used to form the tubular shaft 22, the tubular shaft 22 is generally cylindrical. The length and diameter of the tubular shaft may also vary depending, for example, on the type of vehicle and the maximum torque to be carried by the torque transferring assembly.

Figure 2:
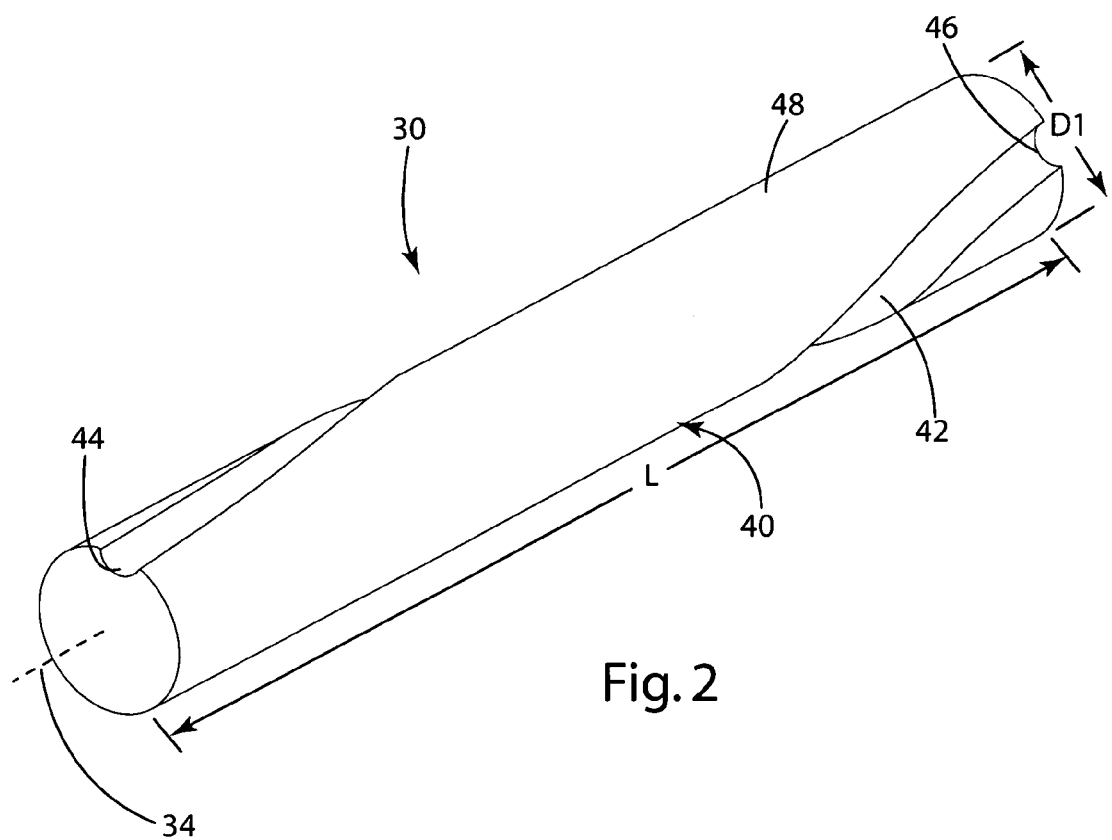
FIG. 2 is a perspective view of the foam damper.

The damper 30 dampens noise and vibration issues produced or transmitted by the torque transferring assembly 20, as well as impact related noises during vehicle operation. As shown in FIG. 2, the damper 30 generally has a length L that varies in proportion to the length of the tubular shaft 22, and an elongated shape that generally matches the shape of the tubular shaft 22. The damper length L may be as long as the tubular shaft but is generally shorter than the length of the tubular shaft 22 to allow room for swaging and, in the illustrated embodiment, the length L of the damper 30 is less than the length of the tubular shaft 22 by approximately two times the inside diameter D of the tubular shaft 22. In the illustrated embodiment, the damper 30 is disposed approximately in the center of the tubular shaft 22 so that it is located approximately one times the inside diameter D from each end of the tubular shaft. By approximately centering the damper 30 within the tubular shaft 22, the assembly is simplified and the necessity to specifically locate the damper assembly along certain nodes within the tubular shaft 22 is eliminated and the tubular shaft 22 may be swaged on each end without interfering with the damper 30. The damper 30 may also be substantially shorter than the length of the tubular shaft, without requiring specific placement at nodal points but is generally at least one third the length of the tubular shaft.

When the damper 30 is in a relaxed or uncompressed state, such as before installation, the damper generally defines an outside diameter D1 that is greater than the inside diameter D of the tubular shaft. The damper 30 further includes a longitudinal axis 34 aligned with the longitudinal axis 32 of the torque transferring assembly 20 when the damper 30 is retained within the torque transferring assembly. The damper 30 may be retained without the use of adhesive due to the outside diameter D1 being assembled within the inside diameter D of the torque transferring assembly in an interference fit arrangement. In the illustrated embodiment, the outside diameter D1 of the damper 30 in a relaxed state is approximately 1.09 times larger than the inside diameter D of the tubular shaft 22. Of course the difference in diameters may vary as needed depending on the application, the type of materials used to form the damper 30, and the amount of interference while maintaining an average density within the desired density range.

In the first embodiment, the damper 30 is illustrated in FIGS. 3 and 4 as being formed from a cylindrical foam structure 40 referred to hereinafter as a foam damper 40. The foam damper 40 generally matches the shape of the tubular shaft and is illustrated in FIG. 2 as being cylindrical. The foam damper 40 includes a channel 42 extending from a first outlet 44 defined by one end to a second outlet 46 defined by the opposing end. In the illustrated embodiment, the outlets 44,46 are radially displaced about the longitudinal axis 34, with the channel 42 located therebetween forming a helix on the outside surface of the foam damper 40. To provide an acceptable level of dampening, it is helpful if the first outlet 44 is not arranged linearly along the longitudinal axis 34 with the second outlet 46. Inventors have found that a range of 30° to 330° radial displacement of the outlets provides improved noise and vibration absorption over outlets that are aligned along the linear axis. In the illustrated embodiment the outlets 44 and 46 are radially displaced 300° about the longitudinal axis. More specifically, by displacing the outlets radially about the longitudinal axis reduces the convergence of noise and vibration energy from the ends of the tubular shaft 22.

Figure 8:
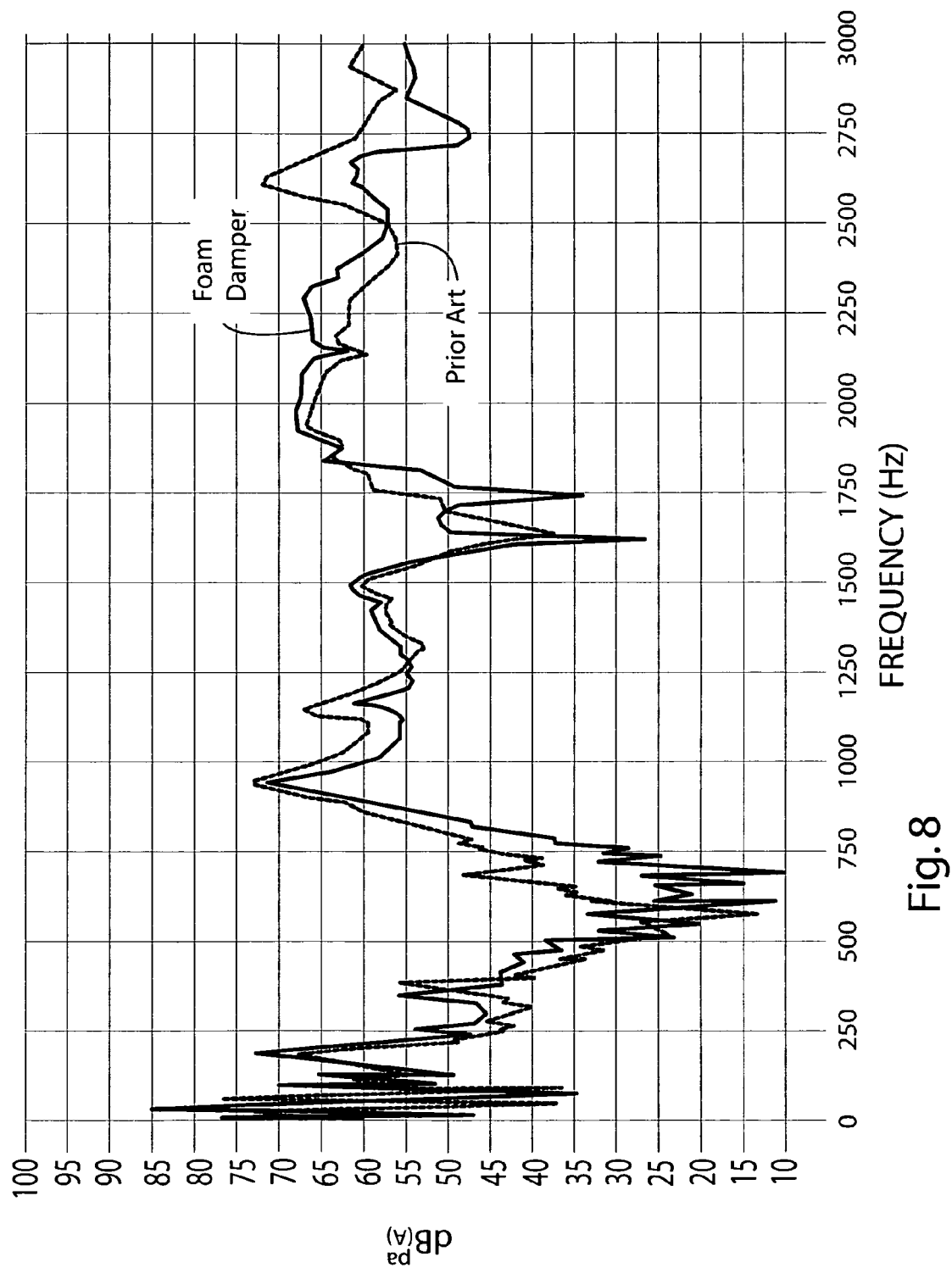
FIG. 8 is a graph showing a comparison of the noise level for a foam damper having a density greater than 1.43 lb/ft$^3$ to the present invention foam damper.

The foam damper 40 is preferably formed of a material having elastic properties to provide a resilient bias force against the inner surface 23 of the tubular shaft 22. The material of the foam damper 40 should also have suitable noise and vibration absorption characteristics. One material that meets the above properties is a polymeric foam material such as an open cell polyurethane foam. It has been found that an open cell polyurethane foam having a permeability of 45–75 percent and more specifically 50–70 percent works particularly well. In the exemplary embodiment used in FIG. 8, the foam damper 40 has an uninstalled density of approximately 1.2 lb/ft$^3$ and a permeability of approximately 62%. One material that fulfills that above criteria is an open cell polyurethane foam, produced by Carpenter and known as 1237W. The foam damper 40 is generally cut to shape and size and then inserted into the tubular shaft 22.

Figure 12:
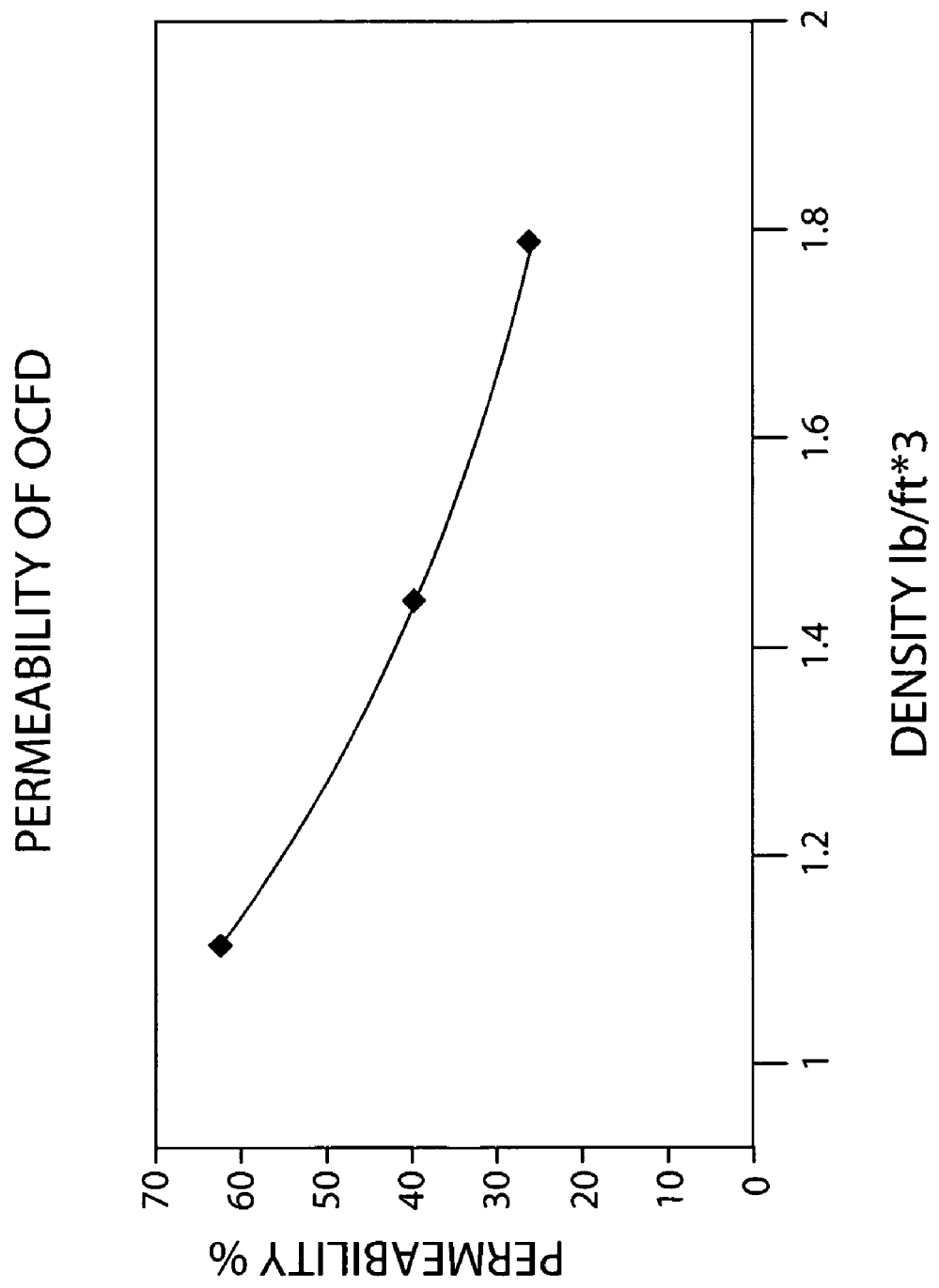
FIG. 12 is a graph showing the relationship of permeability to density for the foam damper.

The density of the foam damper 40 is important with respect to the foam damper's ability to reduce noise and vibration issue across a wide range of frequencies and to reduce the intensity of noise and vibrational frequencies to an acceptable level or below an acceptable level. Preferably, the material has a detisity of less than 1.4 lb/ft$^3$ and greater than 1.0 lb/ft$^3$ when it is installed within the tubular shaft 22, and more preferably, the material has a density of approximately 1.31 lb/ft$^3$ when the foam damper 40 is compressed and installed within the tubujar shaft. For purposes of this application, the installed density is a straight line calculation based on the uninstalled detisity and the interference fit. In the illustrated embodiment the open cell polyurethane foam generally has a density of approximately 1.2 lb/ft$^3$ or less in its relaxed state before installation. Most existing foam dampers use foam having a density greater than 1.4 lb/ft$^3$ and typically greater than 5 lb/ft$^3$ but the inventors have found unique benefits when the density is less than 1.4 lb/ft$^3$ but greater than about 1 lb/ft$^3$ in an installed state. In general, and as illustrated in FIG. 12, the permeability is inversely related to the density, with a lower density foam having a greater permeability due to less foam per cubic foot. The lower detsity and higher permeability allow the easier vibration of the foam cells thereby absorbing noise and vibration. A Jow density foam of about 1.31–1.37 lb/ft$^3$ in an installed state generally has a permeability, pore size and cellular structure to attenuate noise and vibration by allowing the foam to vibrate and thereby dissipate the noise and vibration energy. It is generally desirable to have a density above 1.0 lb/ft$^3$ in the installed state to prevent the foam from becoming too permeable and thereby allowing the noise and vibration energy to be passed through the foam without being absorbed. The low foam damper 40 performs better in absorbing noises and vibrations than foam materials having a density greater than 1.4 lb/ft$^3$ across a wider range of frequencies. A comparison of the performances of the present invention having a density of approximately 1.31 lb/ft$^3$ in an installed state to a foam damper having a density of about 1.43 lb/ft$^3$ may be seen in FIG. 8.

Figure 6:
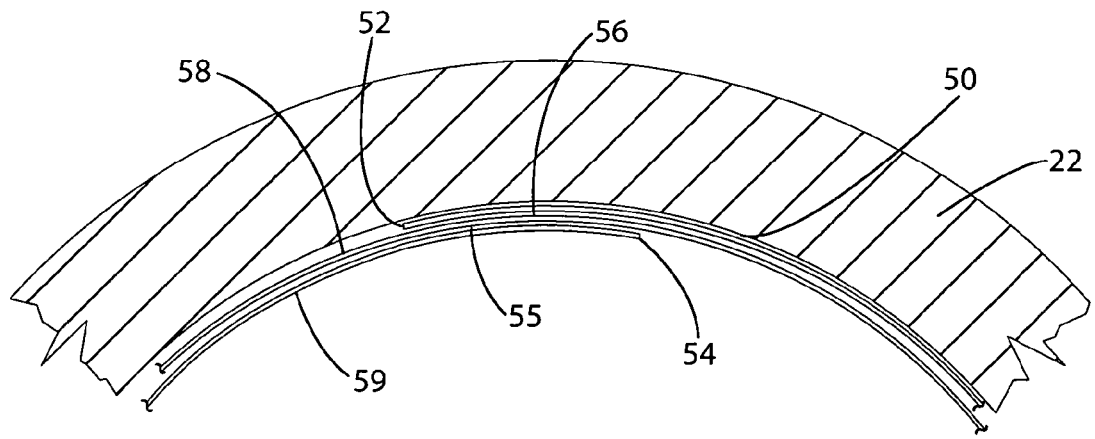
FIG. 6 is an enlarged sectional view of the torque transferring assembly in FIG. 5.
Figure 9:
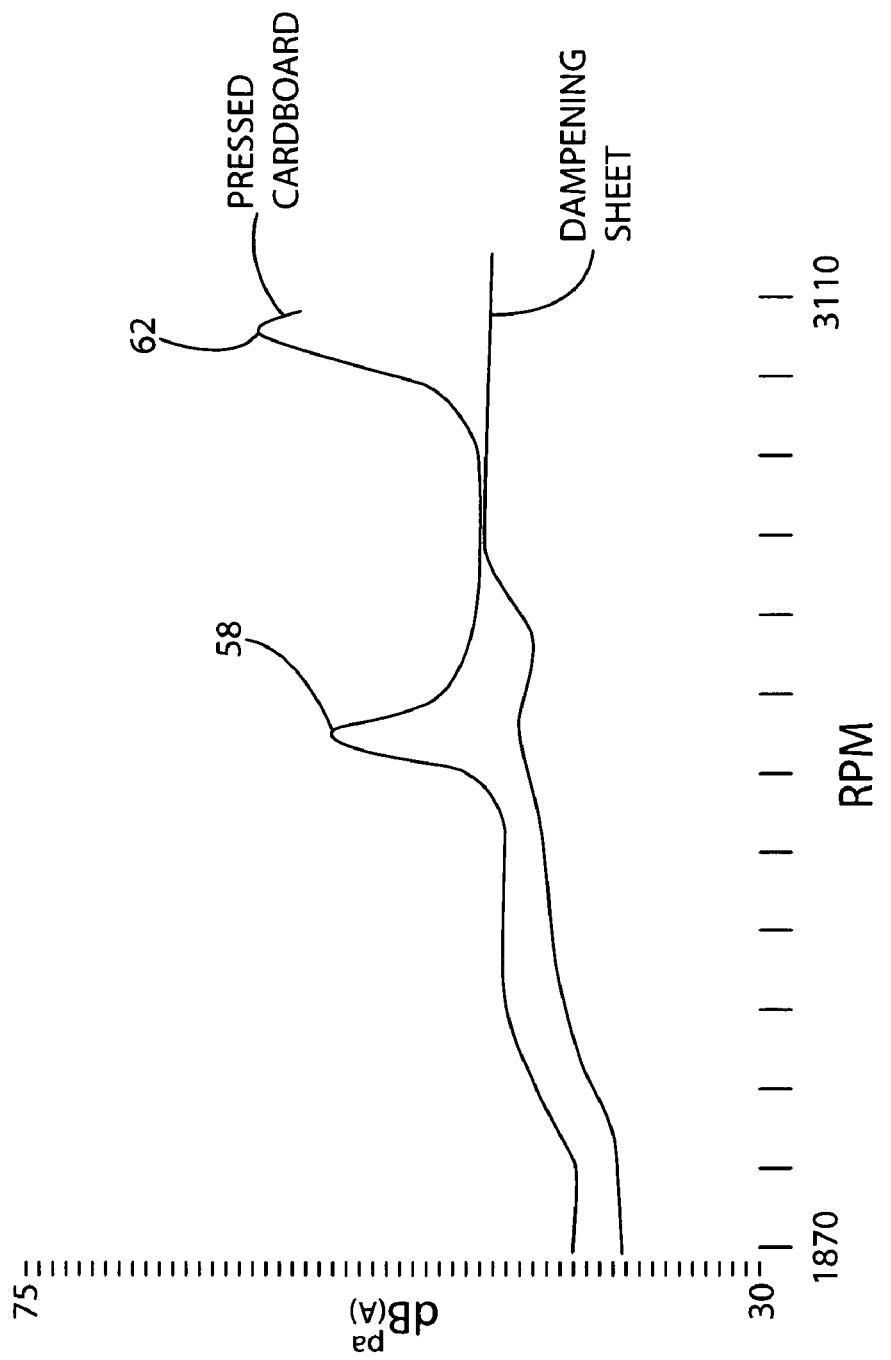
FIG. 9 is a graph showing a comparison of the noise level for a corrugated cardboard liner to the dampening sheet of the present invention.
Figure 10:
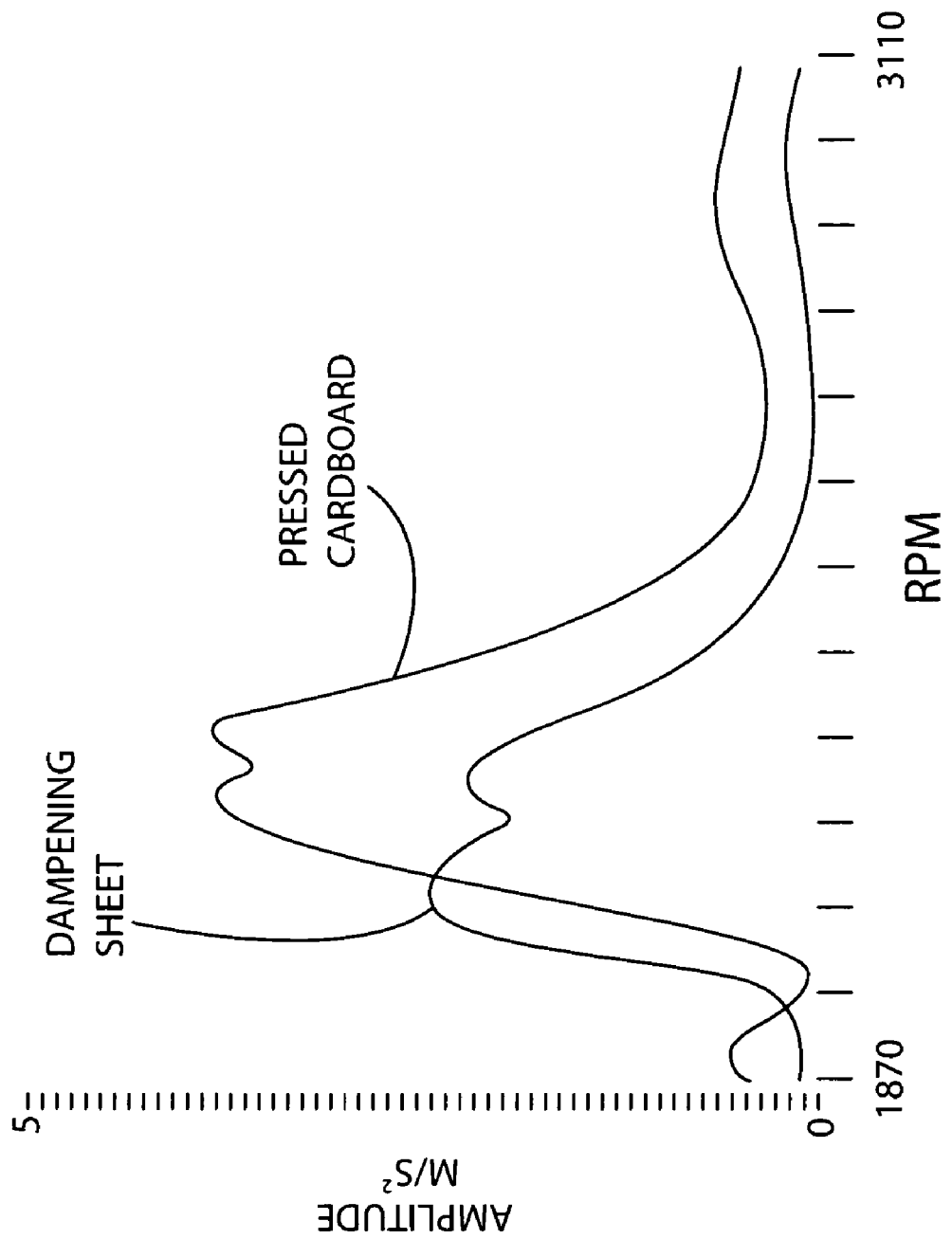
FIG. 10 is a graph showing a comparison of the vibration level for a corrugated cardboard liner to the dampening sheet of the present invention.

In a second embodiment, illustrated in FIGS. 5 and 6, the damper 30 is a dampening sheet 50, which acts as a multilayer energy dissipater. The dampening sheet 50 includes a first elongated end 52 coiled about a second elongated end 54 and an outer surface 58 and an inner surface 59. Preferably, the ends 52 and 54 are approximately parallel to axis 32. The first end 52 overlaps the second end 54 so that a boundary layer 55 is formed between the inner and outer surfaces. The first end 52 of the dampening sheets 50 generally overlaps the second end by at least 30°, but is coiled to overlap the second end less than 1470°. In the preferred embodiment, the first end is coiled at least one revolution about the second end so that an intermediate layer 56 is located between the first and second ends 52, 54 with a boundary layer between each of the first end and second end and the intermediate layer 56 (FIB. 5). Inventors have found that up to three full rotations provide the best absorption of noise and vibration energy. When the dampening sheet 50 is installed into the tubular stall 22, the first and second ends 52 and 54 are moveable relative to each other. More specifically, the inner and outer surfaces 58, 59 are substantially smooth to facilitate movement along the boundary layer 55 and thereby movement of the second end 54 relative to the first end 52. Movement along the boundary layer dissipates energy thereby absorbing noise and vibration. A comparison of a corrugated cardboard liner to the dampening sheet may be seen FIGS. 9 and 10. In the preferred embodiment, the first end and second end are approximately aligned so that the first and second are within about one inch of each other on the same end or within one of being located on directly opposing sides of the tubular shaft.

The dampening sheet 50 is generally formed from a material having a stiffness of approximately 250 to 575 lb/in$^2$ along the machine direction and 50 to 200 lb/in$^2$ cross direction to absorb noises and vibrations either produced by or transmitted by the torque transferring assembly. In the preferred embodiment, the material has a stiffness of 280 to 500 lb/in$^2$ along the machine direction and 60 to 200 lb/in$^2$ cross direction. In the illustrated embodiment, the dampening sheet 50 is formed from a cellulose material having a thickness of about 0.4 to 0.65 mm and a basis weight of about 68.4 with a weight of about 877.8 lb per 1000 pieces to a basis weight of 84 with a weight of about 1078 lbs per 1000 pieces. In the preferred embodiment, the dampening sheet has a basis weight of about 84 with a weight of about 943 lbs per 1000 pieces. Applicants have found that virgin fiber material having fibers greater in length than fibers found in recycled material provides more noise and energy vibration absorption than recycled materials. The dampening sheet 50 may be coated with a moisture resistant material to ensure operability when exposed to a wide range of conditions including changes in humidity as well as moisture within the tubular shaft. The moisture resistant coating may increase the stiffness of the dampening sheet 50. The surface of the dampening sheet 50 is textured to include voids on a microscopic level to allow the dampening sheet to improve dissipation of energy through vibration. The moisture resistant coating may enhance the surface texturing and properties of the dampening sheet to better absorb noise and vibrational energy. The voids and texturing optimize the friction coefficient to improve the boundary layer energy dissipation.

In a relaxed state, prior to insertion in the tubular shaft 22, the dampening sheet 50 defines a diameter that is greater than the inside diameter D of the tubular shaft 22 so that when the dampening sheet is installed into the tubular shaft, the dampening sheet is resiliently biased against the inner surface 23 of the tubular shaft. The resilient bias force holds the dampening sheet 50 in place during operation of the vehicle. Further, as the torque transferring assembly changes in rotational velocity, the first and second ends 52 and 54 may move relative to each other to help absorb noise, vibration, and harshness issues. More specifically, as the torque transferring assembly changes positively in rotational velocity, the resilient biasing force is increased. A comparison of the noise level for a traditional cardboard liner to the present invention may be seen in FIG. 9 and a comparison of vibrations levels in FIG. 10.

In a third embodiment, shown in FIG. 7, the foam damper 40 of the first embodiment is combined with dampening sheet 50 of the second embodiment. More specifically, the dampening sheet 50 is coiled around the foam damper 40 and inserted into the tubular shaft 22 with the dampening sheet engaging the inner surface 23 of the tubular shaft. The dampening sheet 50 surrounding the foam damper 40 increases the ease of assembly.

In the third embodiment, the foam damper 40 is generally formed in a cylindrical shape and sized to have a density less than 1.4 lb/ft$^3$ typically 1.31 lb/ft$^3$ by accounting for the additional thickness of the dampening sheet 50 between the foam damper 40 and the inner surface 23 of the tubular shaft 22. The dampening sheet 50 is formed as described above in conjunction with the second embodiment.

Figure 11:
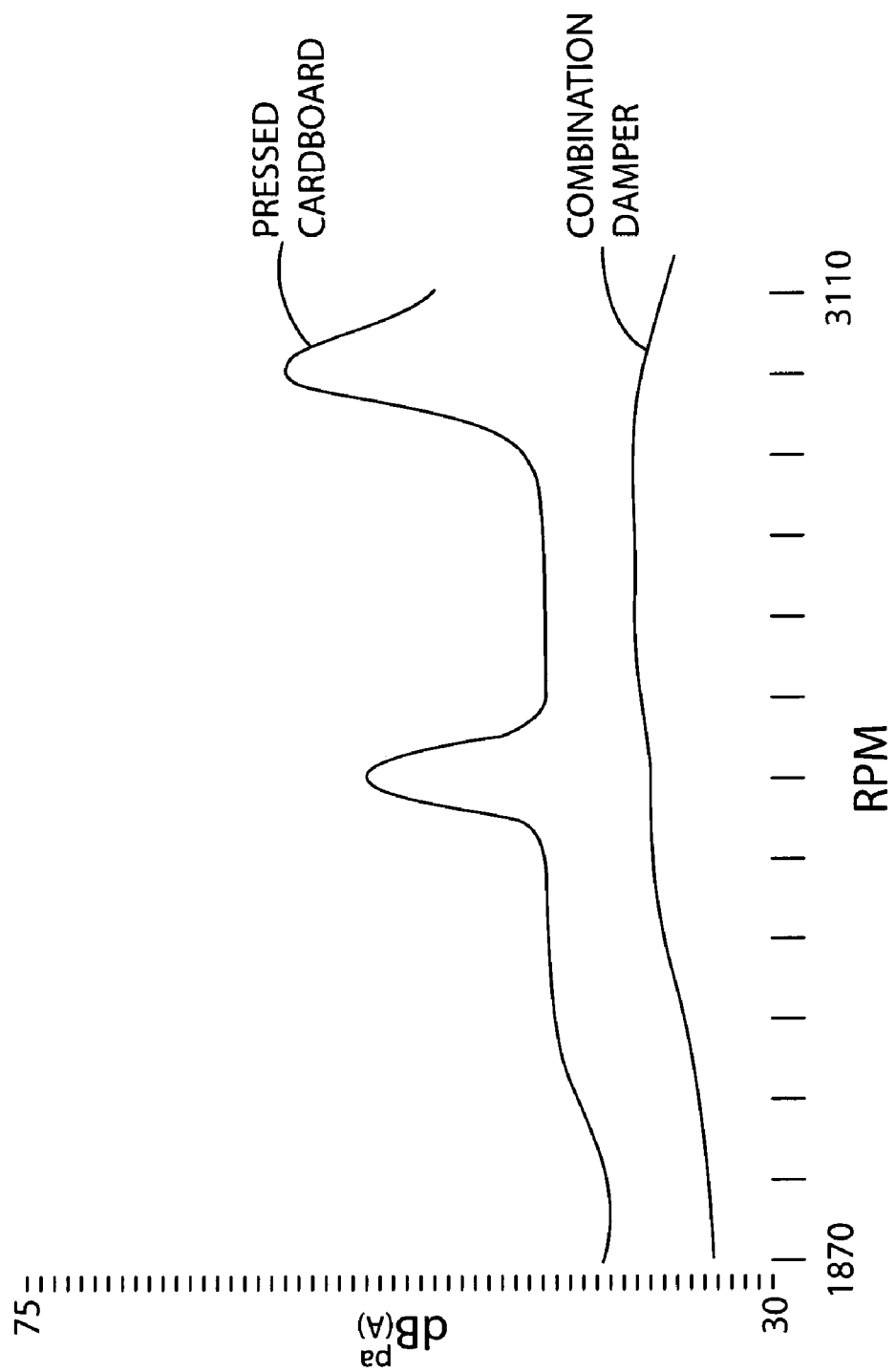
FIG. 11 is a graph showing the noise level of the present invention combination damper.

The combination of the foam damper 40 and dampening sheet 50 creates a combination damper 60 that reduces in intensity a wider range of frequencies than the foam damper and dampening sheet individually. More specifically, the foam damper generally is better at reducing below 1500 Hz range frequencies while the dampening sheet is better at reducing 1500 Hz and higher range frequencies, and when combined to form the combination damper, they reduce a broad range of frequencies. A graph showing the frequency ranges and level of noise is illustrated in FIG. 11.

The damper 30 is assembled into the tubular shaft 22 during assembly of the torque transferring assembly 20 through a variety of methods. By way of example, in the first embodiment, the foam damper 40 is pressed into place. In the second embodiment, the dampening sheet 50 may be rolled into a diameter less than the diameter D of the tubular shaft, inserted into the proper position and allowed to expand to engage the inner surface of the tubular shaft 22.

In the third embodiment, the dampening sheet 50 may be wrapped around the foam core damper 40 and then tightened, thereby compressing, the foam core 40 until the outer surface of the combination damper 60 has a diameter less than the inside diameter D of the tubular shaft 22. Once inserted into the tubular shaft 22, the combination damper 60 is allowed to expand. The combined resilient biasing forces of the foam damper and dampening sheet against the inner surface 23 of the tubular shaft 22 generally provide sufficient force to prevent the damper 60 from moving relative to the tubular shaft and to prevent the core from moving relative to the dampening sheet without the need for any additional rubber bumpers, adhesive or any other retention technique.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

The invention claimed is:

1. A torque transferring assembly for dampening noise and vibration comprising:
    a tubular shaft for carrying a torsion load having an inner surface;
    a damper for insertion into the tubular shaft, the damper including a core and a dampening sheet resiliently biased against said inner surface and including a first end and a second end, said first end being coiled about said core to overlap said second end and providing a boundary layer therebetween, said first and second ends movable relative to each other, whereby energy is dissipated as the ends move across the boundary layer.

2. The torque transferring assembly of claim 1 wherein said dampening sheet is coiled at least one full revolution about said second end.

3. The torque transferring assembly of claim 1 wherein said damper includes a longitudinal axis and said first and second ends are approximately parallel to said longitudinal axis.

4. The torque transferring assembly of claim 1 wherein said core is resiliently biased against said dampening sheet to prevent movement of said core relative to said dampening sheet.

5. The torque transferring assembly of claim 4 wherein said core is formed from a material having a density less than 1.4 $lb/ft^3$.

6. The torque transferring assembly of claim 5 wherein said core has a density greater than 1 $lb/ft^3$.

7. The torque transferring assembly of claim 6 wherein said damper includes a relaxed state and wherein in said relaxed state, said core has a density of approximately 1.2 $lb/ft^3$.

8. The torque transferring assembly of claim 1 wherein said core includes a longitudinal axis dad an outer surface defining a channel and wherein said channel forms a helix about said longitudinal sheet.

9. The torque transferring assembly of claim 8 wherein said channel includes a first outlet and a second outlet and wherein said first and second outlets are radially disposed about longitudinal axis.

* * * * *